Figure 1:
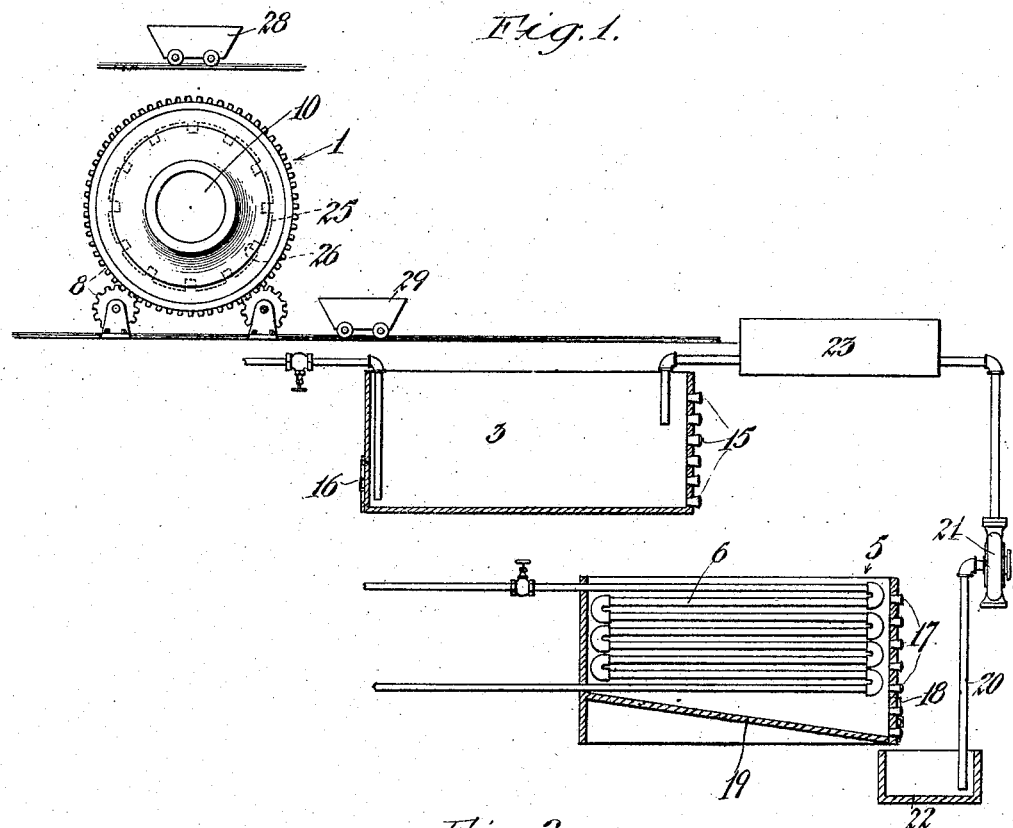

G. E. BAILEY.
PROCESS OF MAKING BORAX.
APPLICATION FILED SEPT. 15, 1908.

911,695.

Patented Feb. 9, 1909.

Witnesses:
Louis W. Gratz
Frank C. Abraham

Inventor
Gilbert E. Bailey
by Townsend & Hackley
attys.

UNITED STATES PATENT OFFICE.

GILBERT E. BAILEY, OF LOS ANGELES, CALIFORNIA, ASSIGNOR OF ONE-HALF TO ARCHIE STEVENSON, OF LOS ANGELES, CALIFORNIA.

PROCESS OF MAKING BORAX.

No. 911,695.       Specification of Letters Patent.      Patented Feb. 9, 1909.

Application filed September 15, 1908. Serial No. 453,169.

*To all whom it may concern:*

Be it known that I, GILBERT E. BAILEY, a citizen of the United States, residing at Los Angeles, in the county of Los Angeles and State of California, have invented a new and useful Process of Making Borax, of which the following is a specification.

The invention relates to a process for the production of borax from native compounds of boron in which the boron is combined with a metal capable of forming an insoluble sulfate. Compounds containing boron and lime or boron and magnesia belong to this class and such compounds are of abundant occurrence in some localities and afford a suitable source for the economical production of borax. In the production of borax from such compounds, as carried out in the process now in general use, it is necessary to manufacture boric acid from the borate of lime, etc., and then obtain borax by treating the acid with sodium carbonate; or to boil the sodium carbonate for a long time with the floured borate of lime to form borax and insoluble lime salts. Either of these processes is necessarily expensive.

The main object of the present invention is to reduce the cost of production of borax from the native borates of the classes specified.

My process is applicable to any native (natural) mineral-borates wherein the base is capable of forming an insoluble sulfate and is intended particularly for the production of borax from natural borates of lime such as the minerals known as colemanite, pandermite, priceite, ulexite, bechelite, hayesine, etc. The process is not confined however to the minerals principally composed of boron and lime, but may be used to form borates of soda from minerals consisting largely of boron and magnesium, such as boracite, hydroboracite, pinnoite, etc., and to all minerals or ores in a native condition containing boron united to calcium or magnesium, or other base that will unite with the acid part of sodium sulfate setting the boron free to unite with the basic (sodium) part of sodium sulfate; forming borax or other borates of sodium.

The process consists essentially in roasting the native borate of lime or magnesium with sodium sulfate, causing a double reaction resulting in formation, on the one hand, of sodium tetraborate (borax) which is soluble in water, and, on the other hand, of insoluble lime or magnesium salts; leaching out the borax with boiling water and precipitating or crystallizing the borax from the solution.

The borax may be separated for use from the solution by the usual manner, but it is preferred to separate the borax from the solution by chilling the solution down to about 32 degrees F.

The accompanying drawings illustrate an apparatus suitable for carrying out the process.

Figure 2:
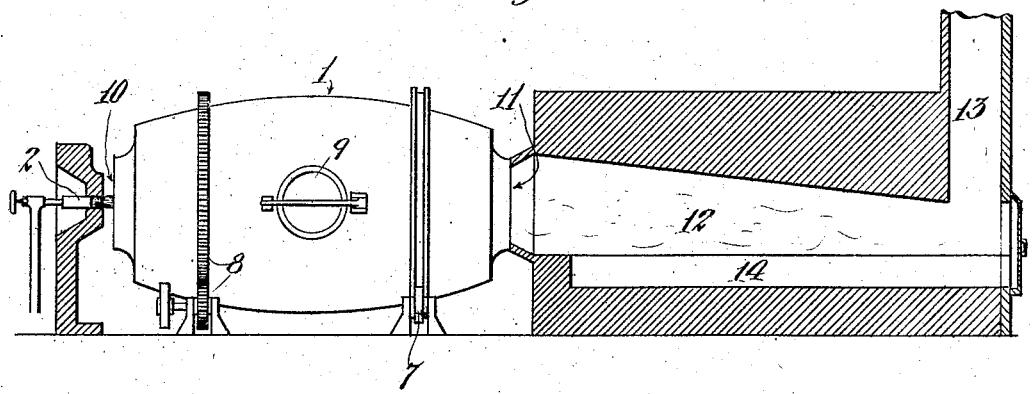

Figure 1 is an elevation of the furnace and piping with the leaching and precipitating tanks in section. Fig. 2 is a longitudinal section of the furnace.

In said drawings 1 designates the furnace which may be a reverberatory furnace, but for obtaining the best operation, it is preferred to use a revolving furnace such as is used in making soda ash by the Le Blanc process. Said furnace is preferably heated by a flame from a distillate or crude oil burner, indicated at 2, but any flame moderately free from soot may be used.

3 designates the leaching tank, in which the furnace product is placed and leached with boiling water.

5 designates the precipitating tank wherein the liquor from the leaching tank is subjected to the action of the cooling coil 6.

Furnace 1 consists of a barrel mounted to roll on wheels 7, provided with driving means 8 to rotate the barrel. Said barrel has a charging and discharging opening provided with a closure 9. One end of barrel 1 has an opening 10, into which the flame from burner 2 is directed to heat the contents of the barrel, as said contents are rolled or tumbled in the rotation of the barrel. Barrel 1 has a lining, indicated at 25, with projections 26, to lift the material. The other end of the barrel 1 has an outlet 11, discharging the waste gases into a suitable flue, as into a chamber 12, communicating with a stack 13, said chamber 12 containing an evaporating pan 14 which may be used to evaporate any of the solutions produced in the process. Transportation means 28, 29 are provided for charging the furnace and removing the charge from the furnace to the leaching tank.

Leaching tank 3 has a series of draw-off plugs 15 located at different heights, so as to draw off the leached liquor in stages, without disturbing the residue of solid material in the tank. A door 16 is provided for raking out the residue. Precipitating tank 5 has a similar series of draw off plugs 17 to draw off the clean liquor without disturbing the precipitate. Tank 5 has a door 18 to permit removal of the precipitate, the bottom 19 of the tank sloping toward this door.

A return connection 20 may be provided, with a pump 21, to pump the liquor from sump 22 back to the leaching tank, through intake heating means, indicated at 23, which may be located in chamber 12 of the furnace.

The process is carried out as follows: The ore or native compound of boron with lime or magnesium, for example, borate of lime (colemanite, pandermite, etc.) is first crushed to moderate fineness, from about 10 mesh to kernel of corn size is found to be fine enough. The smaller the charge the finer the crushing. The crushed material is then mixed with sodium sulfate in about molecular proportions, care being taken to provide that the sodium is in slight excess of the quantity necessary to combine with the boron. In so mixing the sodium sulfate with the borate of lime, etc., the sodium sulfate should be in a sufficiently divided condition to permit of uniform mixture and may be air dried or moderately hard but need not be anhydrous. The charge formed of this mixture is placed in the furnace 1 and heated slowly to a bright red heat. It is not desirable to heat the charge too rapidly, or to heat it until it fuses, as this produces a hard compound difficult to leach. Slow heating to a bright red all through the mass, and holding such heat for a few minutes gives the best results. In the case of colemanite $Ca_2B_6O_{11}.5H_2O$ the chemical reaction is represented by the equation

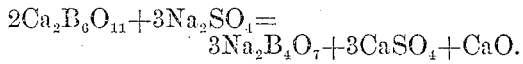
$$2Ca_2B_6O_{11}+3Na_2SO_4=3Na_2B_4O_7+3CaSO_4+CaO.$$

The colemanite and the sodium sulfate lose their water of crystallization during the roasting. The charge is then transferred to the tank or receptacle 3 and treated with boiling water supplied by the pipe 4 until all the borax is extracted. In practice it is best to treat the mass by successive portions of the boiling water or wet steam, drawing the water off and repeating the operation as the water becomes saturated. The solution so drawn off may be settled, evaporated or crystallized by any of the ordinary methods; but it is preferred to chill the solution at once, as by passing it into the refrigerating tank 5, wherein the borax is nearly all precipitated at 32 to 34 degrees F, yielding the borax in a fine powder and saving tedious crystallization followed by grinding. The liquor remaining in the refrigerating tank after precipitation can be pumped or drawn back to the heating means 23, and after being heated to boiling temperature can be used over again in the leaching tank, thus saving any portion of tetraborate which is not precipitated.

In case a refrigerating plant is not available, the borax liquor may be evaporated down in the pan 14, heated by the waste gases of the furnace, the borax being then crystallized out.

What I claim is:

1. The process of manufacturing borax direct from a borate of a metal capable of forming an insoluble sulfate which consists in roasting said borate with sodium sulfate, leaching the roasted product and separating the dissolved borax from the leaching liquor.

2. The process of producing a borate of sodium from the native ores containing a borate of a metal capable of forming an insoluble sulfate which consists in roasting said ores with sodium sulfate; leaching the roasted product, and separating the dissolved sodium borate from the leaching liquor.

3. The process of producing borax from native borates of lime and magnesia which consists in roasting said native borates with sodium sulfate; leaching the roasted product; removing the leaching liquor from the product, and cooling the said liquor nearly to the freezing point of water, thereby precipitating borax therefrom in a finely divided state.

In testimony whereof, I have hereunto set my hand at Los Angeles, California, this 3rd day of September, 1908.

GILBERT E. BAILEY.

In presence of—
ARTHUR P. KNIGHT,
FRANK L. A. GRAHAM.